(12) United States Patent
He et al.

(10) Patent No.: US 8,931,965 B2
(45) Date of Patent: Jan. 13, 2015

(54) OPTICAL CONNECTOR FOR DECREASING LOSS OF OPTICAL SIGNAL TRANSMISSION

(76) Inventors: Jia-Yong He, Kun Shan (CN); Qi-Sheng Zheng, Kun Shan (CN)

( * ) Notice: Subject to any disclaimer, the term of this patent is extended or adjusted under 35 U.S.C. 154(b) by 328 days.

(21) Appl. No.: 13/135,686

(22) Filed: Jul. 13, 2011
(Under 37 CFR 1.47)

(65) Prior Publication Data

US 2012/0213477 A1    Aug. 23, 2012

(30) Foreign Application Priority Data

Jul. 13, 2010    (CN) .......................... 2010 2 0256449

(51) Int. Cl.
| | | |
|---|---|---|
| G02B 6/36 | (2006.01) |
| G02B 6/32 | (2006.01) |
| G02B 6/00 | (2006.01) |
| H01R 13/58 | (2006.01) |
| H01R 9/03 | (2006.01) |
| H01R 13/648 | (2006.01) |

(52) U.S. Cl.
USPC ................ 385/93; 385/33; 385/53; 385/139; 439/452; 439/607

(58) Field of Classification Search
USPC ........... 385/14, 33, 58, 75–77, 88–90, 92–94, 385/101, 139; 439/452, 607
See application file for complete search history.

(56) References Cited

U.S. PATENT DOCUMENTS

2006/0239619 A1*  10/2006  Luther et al. .................... 385/69
2009/0324176 A1*  12/2009  Cheng et al. .................... 385/73
2010/0080519 A1*   4/2010  Ko et al. .......................... 385/93
2010/0278490 A1*  11/2010  Liao et al. ....................... 385/90

FOREIGN PATENT DOCUMENTS

CN            201438225 Y        4/2010

* cited by examiner

*Primary Examiner* — K. Cyrus Kianni
*Assistant Examiner* — Hung Lam

(57) ABSTRACT

An optical connector includes an insulative housing, an optical module movably retained on the insulative housing, and a spring being assembled between the insulative housing and the optical module along a front to back direction. The optical module has a hemispheric projection at a rear side thereof. The spring has a first end positioned on the insulative housing and a second end ringing on the projection and resisting against a hemispheric surface of the projection. The second end moves on the hemispheric surface of the projection when the spring is compressed to move upwardly or laterally.

18 Claims, 6 Drawing Sheets

OPTICAL CONNECTOR FOR DECREASING LOSS OF OPTICAL SIGNAL TRANSMISSION

BACKGROUND OF THE INVENTION

1. Field of the Invention

The present invention relates to an optical connector, and more particularly to optical connectors for decreasing loss of optical signal transmission.

2. Description of Related Art

Optical connector used on a computer would be an inevitable trend of development for increasing signal transmission rate. China Patent CN201435225Y discloses an optical connector which is based on USB 3.0 connector and added some optical fibers to the current USB 3.0 connector for adapting development of electronic industry. The optical connector includes an insulative housing, a number of contacts retained on the insulative housing, an optical module, and a spring connecting the insulative housing and the optical module. The insulative housing has a cavity recessed from a lower surface thereof, a cutout behind the cavity and a first post extending toward the cavity from a rear inner wall of the cutout. The optical module has a base movably received in the cavity and a number of fibers retained on the base to transmit optical signal. The base has a second post backwardly extending from a rear end thereof. The first and second posts are located at a same line along a front to back direction and face to each other. The spring has two ends. One end of the spring rings on the first post, and another end of the spring rings on the second post to connecting the insulative housing and the optical module together.

When the optical connector is inserted into a mating connector, the optical module would be pushed backwardly, at this time, the spring is compressed which easily make a middle position of the spring offset upwardly or laterally, then the spring will drive a rear side of the optical module to offset upwardly or laterally. Therefore, an optical module of the mating connector can not exactly mate with the optical module of the optical connector along the front to back direction, which will increase loss of the optical signal transmission.

Hence, an improved optical connector is desired to overcome the above problems.

BRIEF SUMMARY OF THE INVENTION

According to the present invention, an optical connector comprises: an insulative housing, an optical module movably retained on the insulative housing, and a spring being assembled between the insulative housing and the optical module along a front to back direction. The optical module has a hemispheric projection at a rear side thereof. The spring has a first end positioned on the insulative housing and a second end ringing on the projection and resisting against the hemispheric surface of the projection. The second end moves on the hemispheric surface of the projection when the spring is compressed to bend upwardly or laterally.

According to another aspect of the present invention, an optical connector comprises: an insulative housing having a body portion and a tongue extending forwardly; a plurality of contacts retained on the insulative housing; an optical module having a base movably received in the cavity and a plurality of fibers retained on the base; and a spring having a first end positioned on the insulative housing and a second end. The insulative housing defines a cavity recessed from one side of the tongue. Each contact has a contact portion forwardly extending to another side of the tongue. The base is formed with a hemispheric projection projecting backwardly. The second end of the spring rings on the projection and moving on a hemispheric surface of the projection when the spring is compressed to bend upwardly or laterally The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

Figure 1:
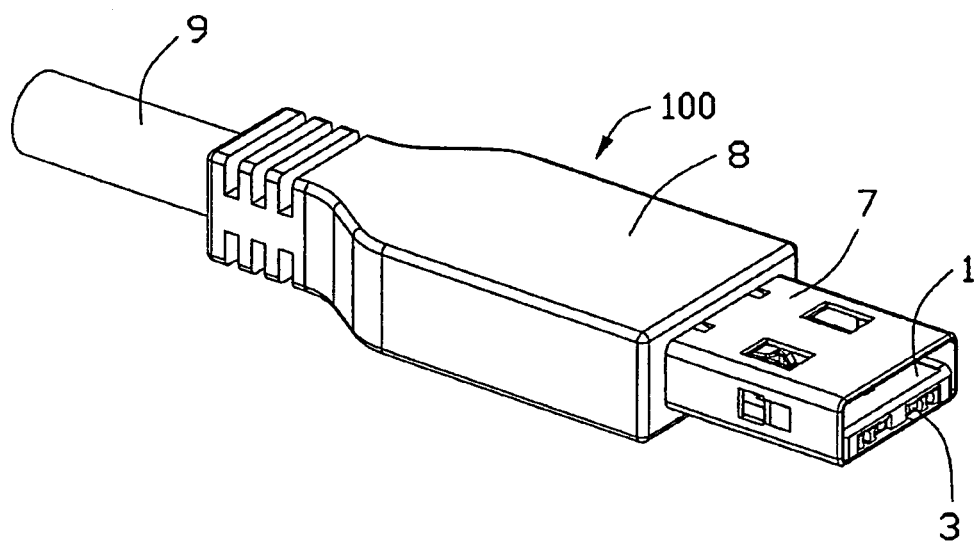
FIG. 1 is a perspective view of an optical connector according to the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Referring to FIGS. 1-6, an optical connector 100 according to the present invention is disclosed. The optical connector 100 is an optical and electrical plug connector, and comprises an insulative housing 1, a plurality of contacts 2 retained in the insulative housing 1, an optical module 3 movably disposed in the insulative housing 1, a spring 4 sandwiched between the optical module 3 and the insulative housing 1, an insulator 5 retained on the insulative housing 1, a spacer 6 fastened on a rear side of the insulator 5, a metal shell 7 covering the insulative housing 1, an outer case 8 covering the metal shell 7 and a cable 9 connecting rear ends of the contacts 2 and the optical module 3. The cable 9 has electrical cable and optical cable.

Referring to FIGS. 2-6, the insulative housing 1 has a top surface 11 and a bottom surface 12 respectively located at top and bottom sides thereof. The insulative housing 1 has a body portion 13 and a tongue 14 forwardly extending from a front end of the body portion 13. The insulative housing 1 defines a plurality of first grooves 131 recessed from a rear side of the bottom surface 12. The body portion 13 defines a receiving space 132 recessed from the top surface 11. The insulator 5 is received in the receiving space 132. The tongue 14 defines a cavity 141 recessed from a front side of the bottom surface 12, a floating recess 142 located behind the floating recess 142, and an opening 144 located behind the floating recess 142 and communicating with the floating recess 142 along a front to back direction. The tongue 14 further defines an arc recess 1421 recessed from an inner top wall of the floating recess 142. The arc recess 1421 is located between the cavity 141 and the opening 144 and communicates with the cavity 141 and the recess 1421 along the front to back direction to receive and limit the spring 4 from moving laterally.

The insulative housing 1 defines a plurality of slots 143 recessed from the bottom surface 12. The slots 143 extend along the front to back direction. Each slot 143 has a slim first slot 1431 located behind the floating recess 142, and a second slot 1432 behind the first slot 1431. The first slots 1431 are located at two sides of the opening 144 along a transverse direction perpendicular to the front to back direction, and communicate with the floating recess 142 along the front to back direction. The adjacent two second slots 1432 communicate with each other along the transverse direction. The floating recess 142 is narrower than the cavity 141 and wider than the first slot 1431 and the second slot 1432. The first slot 1431 communicates with the second slot 1432 along the front to back direction. The insulative housing 1 has a second post 1441 forwardly extending toward the cavity 141 from a rear inner wall of the opening 144.

The spring 4 extends along the front to back direction, and has a first end 41 at a rear end thereof, a second end 42 at a front end thereof, and a middle portion 43 connecting the first end 41 and the second end 42. The first end 41 is received in the opening 144 and rings on the second post 1441 for positioning the spring 4 to the insulative housing 1. An upper side of the middle portion 43 of the spring 4 is received in the arc recess 1421 to limit the spring 4 from overly moving along the transverse direction.

The insulative housing 1 further defines a depression 146 recessed from the bottom surface 12 and located behind the cavity 141. The depression 146 is shallower than the cavity 141, the floating recess 142, the opening 144 and the first slot 1431 along an up to down direction perpendicular to both the front to back direction and the transverse direction. The depression 146 communicates with the cavity 141 along the front to back direction, and communicates with the floating recess 142, the opening 144 and the first slot 1431 along the up to down direction. The optical connector 100 further has a cover 10 received in the depression 146 to limit the spring 4 together with the insulative housing 1. The insulative housing 1 further defines a pair of position holes 1461 recessed from an top inner wall of the depression 146 and located at two sides of the floating recess 142. The cover 10 has a pair of position posts 101 to engage with the position holes 1461 respectively. The cover 10 further defines a cutout 102 corresponding to the opening 144 and the arc recess 1421 along the up to down direction. A lower side of the spring 4 is received in the opening 144 to make the spring 4 have a small floating space along the up to down direction. The tongue 14 has a V-shaped block 145 protruding into the cavity 141 from a middle of front position thereof, and a pair of protrusions 147 at two sides of the block 145. The tongue 14 further defines a plurality of second grooves 148 recessed from a rear side of a top surface thereof.

An arrangement of the contacts 2 on the tongue 14 in the present invention is compatible to that of a standard USB 3.0 connector (not shown). The contacts 2 comprise a plurality of first contacts 21 insert molded in the insulative housing 1 and a plurality of second contacts 22. Each first contact 21 has a flat first contact portion 211 located at a front side of the second grooves 148, and a first tail portion 212 received in the first grooves 131 to connect with the cable 9. Each second contact 22 has a flexible second contact portion 221 extending to the second grooves 148 of the tongue 14, a second tail portion 223 at a rear end thereof to electrically connect with the cable 9, and a second retaining portion 222 connecting the second contact portion 221 and the second tail portion 223 together and retained in the insulator 5. The first contact portions 211 and the second contact portions 221 are located on the top surface of the tongue 14, and arranged in two rows along the front to back direction. The first contact portions 211 are located at a front side of the second contact portions 221 and spaced apart from the second contact portions 221 along the front to back direction. The optical module 3 is spaced apart from the first and second contact portions 211, 221 along the up to down direction.

The insulator 5 has a plurality of passageways 51 extending therethrough along the front to back direction. The second retaining portions 222 are retained in the passageways 51. The spacer 6 protrudes into the passageways 51 to position the second retaining portions 222 in the passageways 51. Of course, the second contacts 22 can be alternatively insert molded in the insulator 5 before the insulator 5 is assembled to the insulative housing 1.

Referring to FIGS. 3-6, the optical module 3 comprises a base 30 and a plurality of fibers 35 assembled to the base 30. The base 30 is movably assembled in the cavity 141 and can move in the cavity 141 along the front to back direction. The base 30 has a V-shaped indention 31 at a front end thereof to engage with the block 145 on the tongue 14, two pairs of lens 32 at two sides of the cutout 31, and two pairs of receiving holes 34 behind the lens 32 and backwardly extending through the base 30. The base 30 further defines two positioning holes 34 at two sides of the lens 32 to mate with two posts on a mating connector (not shown), which can make the optical connector 100 in the present invention and the mating connector align to each other when the optical connector 100 is inserted into the mating connector, then the optical module 3 can transmit optical signal along a straight line.

The base 30 is formed with a first post 36 backwardly from a middle of rear position thereof. The first post 36 has a hemispheric projection 361 at a rear end thereof. The first post 36 and the second post 1441 are located at a same straight line and extend toward each other. The second end 42 rings on the hemispheric projection 361 and resists against a hemispheric surface of the projection 361. In an inserting process of the optical connector 100, the spring 4 is compressed to be offset along the transverse direction or the up to down direction, then the second end 42 is driven to move on the hemispheric surface of the hemispheric projection 361 and do not drive the base 30 to move along the transverse direction or the up to down direction. Therefore, the optical module 3 can transmit optical signal along the front to back direction, and the loss of the optical signal transmission can be decreased. Besides, the base 30 can be alternatively designed without the first post 36, and the hemispheric projection 361 directly extends from a rear end surface of the base 30, which can achieve the above purpose also. In addition, the base 30 can alternatively be made with the material same to that of the lens 32.

The optical connector 100 comprises four fibers 35. Each fiber 35 has a coupling portion 351 positioned in the receiving holes 34 behind the lenses 32, a floating portion 355 backwardly extending from a rear end of the coupling portion 351, a positioning portion 352 backwardly extending from a rear end of the coupling portion 351 and received in the first slots 1431, a bending portion 353 backwardly extending form a rear end of the positioning portion 352 and received in the second slots 1432, and a connecting portion 354 backwardly extending out of a rear end of the insulative housing 1 from a rear end of the bending portion 353 to connect with the cable 9. The coupling portions 351 correspond to the lens 32 one by one along the front to back direction. The floating portions 355 can slightly move in a small range along the transverse direction and the up to down direction when the base 30 moves. The positioning portions 352 are respectively received in the slim first slots 1431 and can not move along the transverse direction. Therefore, the positioning portions 352 can lug the base 30 to prevent the base 30 from moving overly along the transverse direction, then the lens 32 and fibers 35 can exactly mate with the mating connector along the front to back direction for assuring an effective optical signal transmission.

In addition, after the optical module 3 being assembled to the insulative housing 1, the cover 10 is positioned in the depression 146 to cover the floating recess 146 and the slim first slots 1431 for limiting the floating portions 355 and the positioning portions 352 of the fibers 35 from moving downwardly, which can lug the base 30 for preventing the base 30 from overly moving along the up to down direction.

Figure 2:
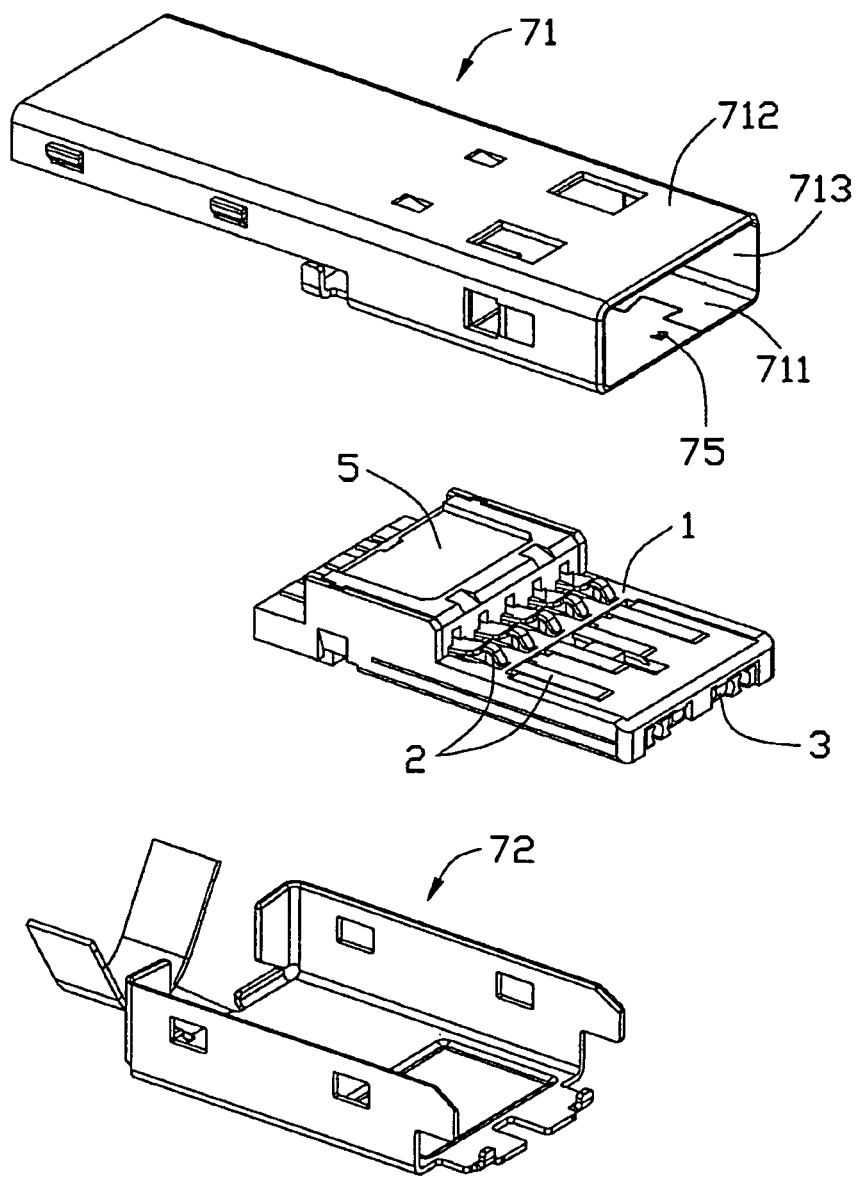
FIG. 2 is a partly exploded view of the optical connector shown in FIG. 1 with a cable and an outer case removed.
Figure 3:
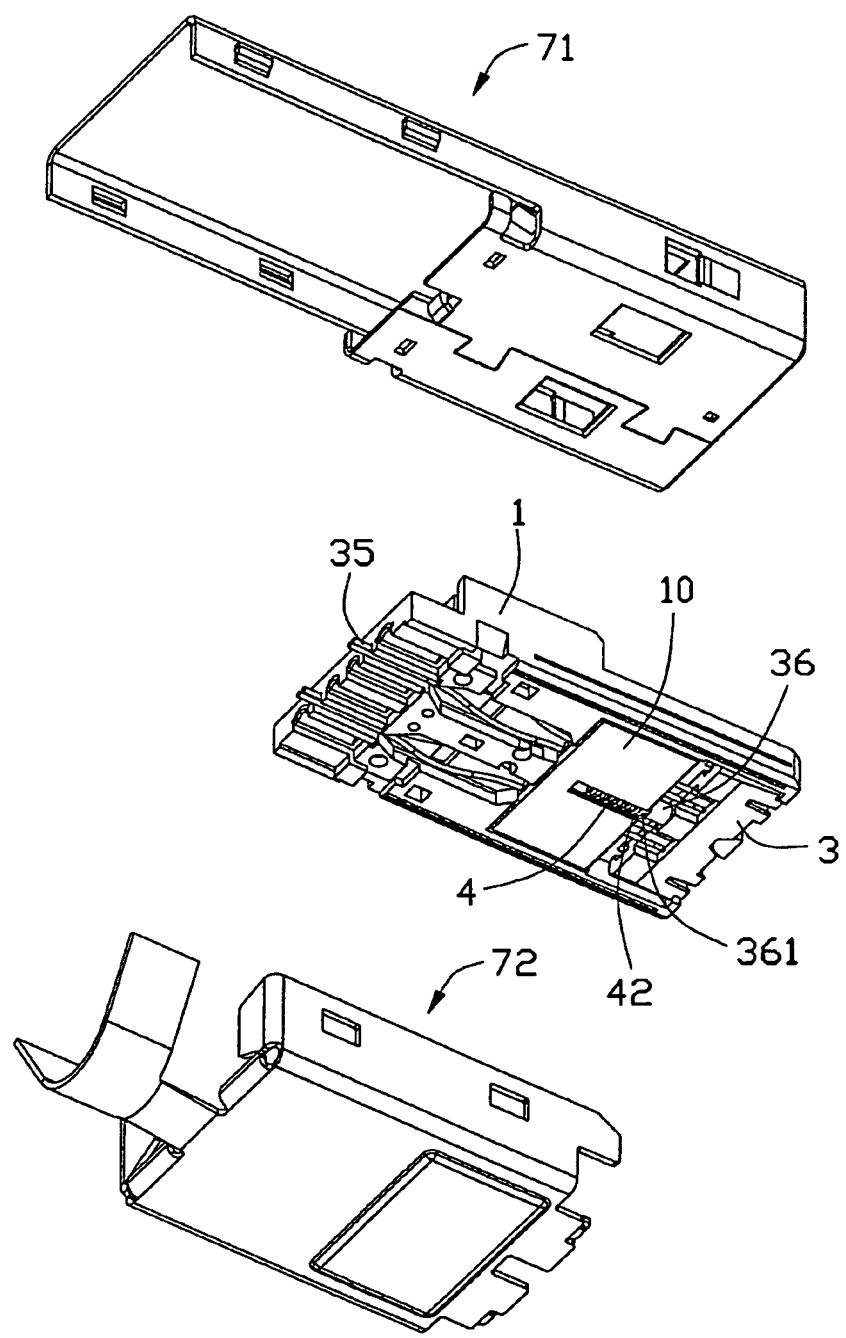
FIG. 3 is a view similar to FIG. 2, while taken from another aspect.
Figure 4:
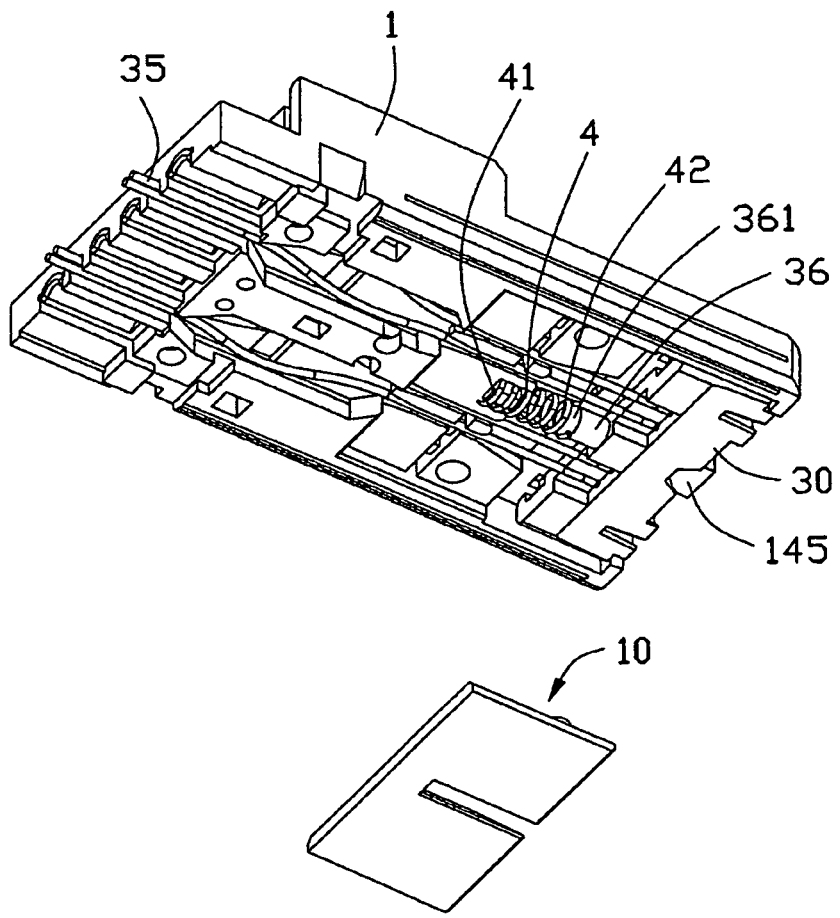
FIG. 4 is a partly perspective view of the optical connector shown in FIG. 3 with a metal shell removed.
Figure 5:
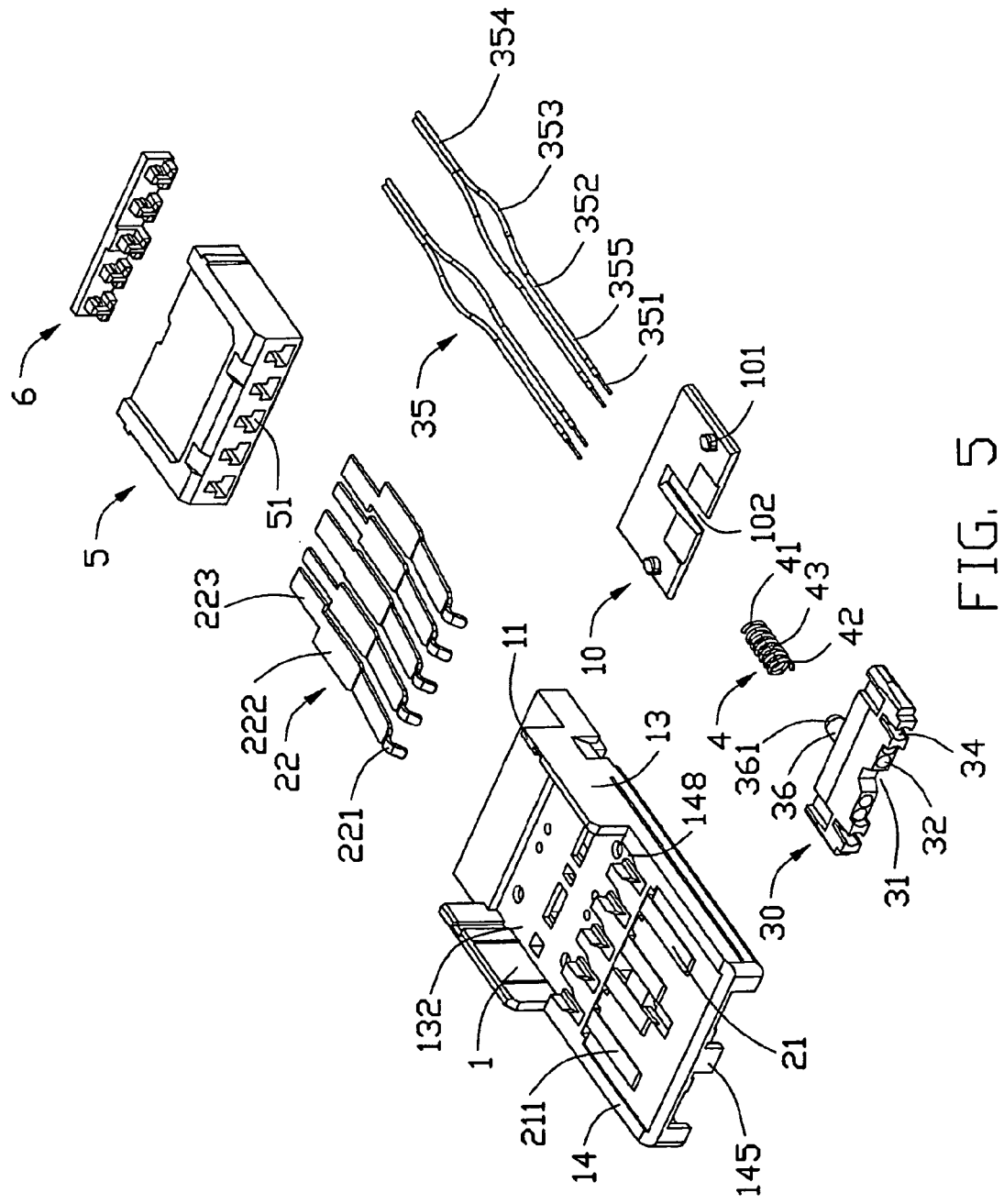
FIG. 5 is an exploded view of the optical connector shown in FIG. 4.
Figure 6:
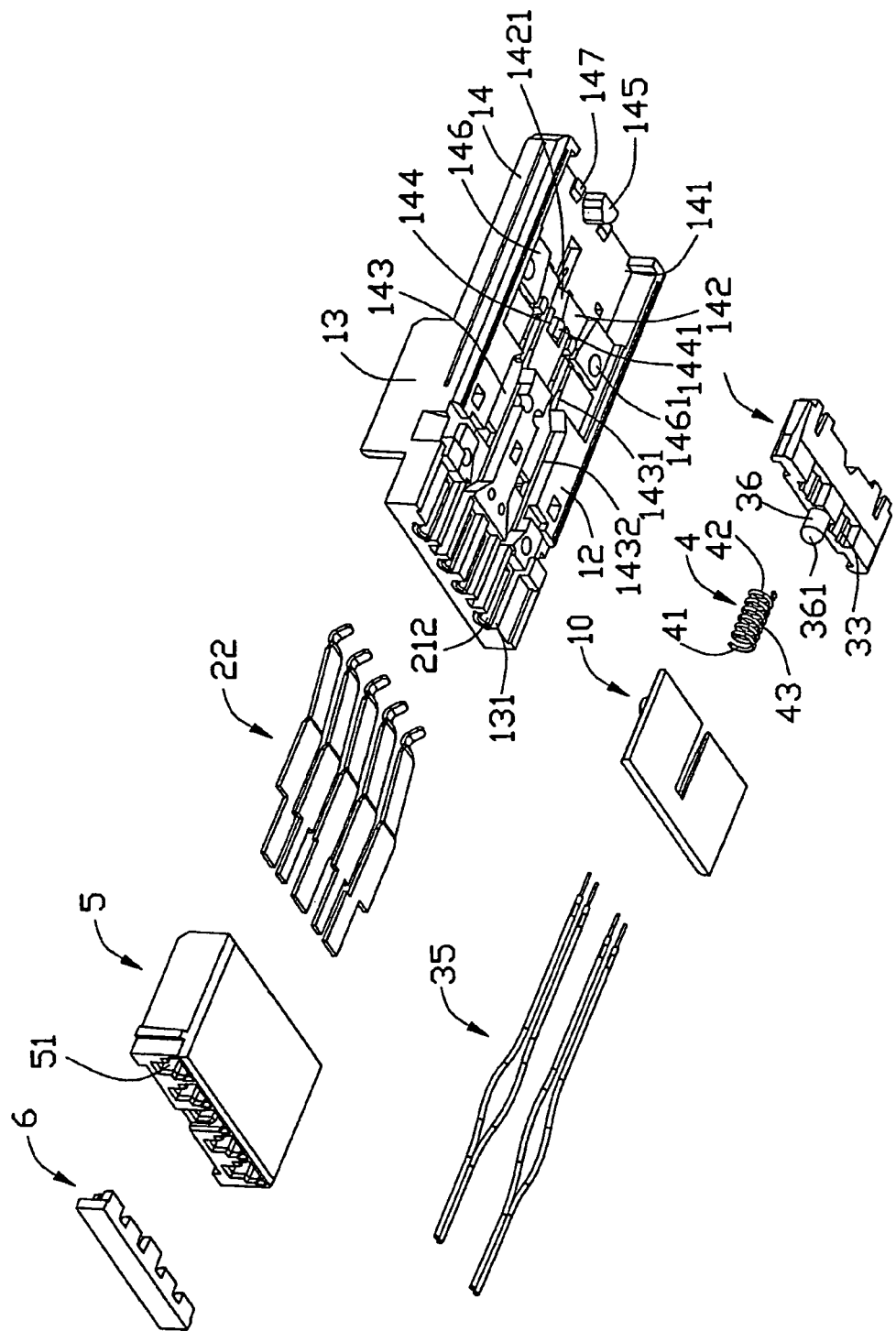
FIG. 6 is a view similar to FIG. 5, while taken from another aspect.

Referring to FIGS. 2-3, the metal shell 7 comprises an upper shell 71 and a lower shell 72 engaging with the upper shell 71 to enclose the insulative housing 1. The upper shell 71 encloses the tongue 14 and has a bottom wall 711 resisting a lower surface of the tongue 14, a top wall 712 opposed to the bottom wall 711 and a pair of side walls 713 connecting the top wall 712 and bottom wall 711 along the up to down direction. The bottom wall 711 has a barb 75 protruding upwardly to resist the optical module 3.

When the optical connector 100 is inserted to the mating connector, the position holes 34 of the optical module 3 engage with the posts on the mating connector. When the posts have a length which is not consistent to a depth of the position holes 34, the spring 4 allows the optical module 3 to move along the front to back direction for adjusting the engagement between the position holes 34 and the posts, which make the optical module 3 flexibly connect with the mating connector; besides, the floating portions 355 are received in the floating recess 146 and can slightly move in a small range along the transverse direction and the up to down direction, while the positioning portions 352 of the fibers 35 are received in the slim first slots 1431 and are limited to move in the front to back direction, thereby the positioning portions 352 can hold the base 30 to prevent the base 30 from overly moving along the transverse direction; in addition, the second end 42 of the spring 4 rings on the hemispheric projection 361, and can moves on the hemispheric surface of the projection 361 when the spring 4 is compressed to offset along the transverse direction or the up to down direction, then the second end 42 will not drive the base 30 to move along the transverse direction or the up to down direction, which can make the optical module 3 mate with that of the mating connector exactly along the front to back direction to transmit optical signal, and the loss of the optical signal transmission can be decreased.

When the optical connector 100 is withdrawn from the mating connector, the spring 4 rebounds to push the base 30 forwardly, then the block 145 resists inner walls of the V-shaped indentation 31 to prevent the base 30 from overly moving along the front to back and the transverse direction. Besides, the lower side of the base 30 resists the barb 75 and the emboss 147 to prevent the base 30 from shaking along the up to down direction. In addition, the second end 42 of the spring 4 moves on the hemispheric projection 361 to return the preliminary position.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. An optical connector, comprising:
an insulative housing;
an optical module movably retained on the insulative housing, and having a first post extending backwardly, the first post formed with a hemispheric projection at a rear end thereof; and
a spring being assembled between the insulative housing and the optical module along a front to back direction, the spring having a first end positioned on the insulative housing and a second end ringing on the hemispheric projection and resisting against a hemispheric surface of the hemispheric projection; wherein
the second end moves on the hemispheric surface of the hemispheric projection when the spring is compressed to bend upwardly or laterally.

2. The optical connector according to claim 1, wherein the insulative housing has an upper surface, a bottom surface and a cavity recessed from a front side of the bottom surface, the optical module has a base received in the cavity and a plurality of fibers extending out of the insulative housing, and the first post extends from a middle position of a rear end of the base.

3. The optical connector according to claim 2, wherein the insulative housing has an opening recessed from the bottom surface and a second post extending forwardly from a rear inner wall of the opening, the first end rings on the second post to position the spring to the insulative housing.

4. The optical connector according to claim 3, wherein the opening is located behind the cavity, and the first post and the second post are located at a same line along the front to back direction and extend toward each other.

5. The optical connector according to claim 4, wherein the insulative housing further has an arc recess between the cavity and the opening, and the spring has a middle portion between the first end and the second end, and an upper side of the middle portion is received in the arc recess.

6. The optical connector according to claim 5, wherein the insulative housing defines a depression recessed from the lower surface, the depression is shallower than the opening and the recess and communicates with the opening and the recess along an up to down direction perpendicular to the front to back direction.

7. The optical connector according to claim 6, further comprising a cover retained in the depression, the cover defines a cutout corresponding to the opening and the recess to make the spring have a small floating space along the up to down direction.

8. The optical connector according to claim 7, wherein the insulative housing has a body portion and a tongue forwardly extending from the body portion, the cavity, the opening and the recess are located at a lower side of the tongue, and the optical connector further comprises a plurality of contacts each of which has a contact portion extending to an upper side of the tongue, and an arrangement of all contact portions on the tongue is compatible to that of a standard USB 3.0 connector.

9. An optical connector, comprising:

an insulative housing having a body portion and a tongue extending forwardly, the insulative housing defining a cavity recessed from one side of the tongue;

a plurality of contacts retained on the insulative housing, each contact having a contact portion forwardly extending to another side of the tongue;

an optical module having a base movably received in the cavity and a plurality of fibers retained on the base, the base being formed with a hemispheric projection projecting backwardly; and a spring having a first end positioned on the insulative housing and a second end ringing on the hemispheric projection and moving on a hemispheric surface of the hemispheric projection when the spring is compressed to bend upwardly or laterally.

10. The optical connector according to claim 9, wherein an arrangement of the contact portions of all contacts on the tongue is compatible to that of a standard USB 3.0 connector, and the contacts are used to transmit USB 3.0 signals.

11. The optical connector according to claim 9, wherein the insulative housing has a second post extending toward the cavity, and the first end of the spring rings on the second post to position the spring to the insulative housing.

12. The optical connector according to claim 11, wherein the base has a first post extending toward the second post, and the first post and the second post are located at a same line along a front to back direction, and the hemispheric projection is formed at a rear end of the first post.

13. An optical connector comprising:
an insulative housing;

an optical module mounted to the housing and moveable relative to the housing along a front-to-back direction, said optical module equipped with optic fibers and lenses for coupling to a complementary optical connector; and a spring defining a section immovable relative to the housing and another section moveable relative to the housing along said front-to-back direction and essentially constantly urging the optical module to move forwardly; wherein said optical module defines a hemispherical surface to constantly abut against said another section of the spring to perform constant engagement therebetween; wherein said another section of the spring defines a ring like structure constantly and compliantly moving along the hemispherical surface so as to have the optical module obtain a balanced position relative to the spring during deformation of the spring.

14. The optical connector as claimed in claim 13, wherein said spring is of a coil shape.

15. The optical connector as claimed in claim 14, wherein said ring like structure defines a center penetrated by an axis of the coil shape of said spring.

16. The optical connector as claimed in claim 13, further including a cover holding the spring in position.

17. The optical connector as claimed in claim 13, wherein the optical module is located at a front edge region of the housing.

18. The optical connector as claimed in claim 13, wherein the section of the spring surrounds a post of the housing.

* * * * *